United States Patent
Chen et al.

(10) Patent No.: US 9,098,247 B2
(45) Date of Patent: *Aug. 4, 2015

(54) TOUCH PANEL AND MANUFACTURING METHOD THEREOF

(71) Applicant: RTR-TECH TECHNOLOGY CO., LTD., Tainan (TW)

(72) Inventors: Wei-Chuan Chen, Tainan (TW); Hsiao-Wen Kuo, Tainan (TW)

(73) Assignee: RTR-TECH TECHNOLOGY CO., LTD., Tainan (TW)

( * ) Notice: Subject to any disclaimer, the term of this patent is extended or adjusted under 35 U.S.C. 154(b) by 36 days.

This patent is subject to a terminal disclaimer.

(21) Appl. No.: 14/041,247

(22) Filed: Sep. 30, 2013

(65) Prior Publication Data
US 2014/0092325 A1  Apr. 3, 2014

(30) Foreign Application Priority Data
Oct. 2, 2012 (TW) .............................. 101136457 A

(51) Int. Cl.
*G06F 1/16* (2006.01)
*G06F 3/041* (2006.01)
*G06F 3/044* (2006.01)

(52) U.S. Cl.
CPC .............. *G06F 1/1692* (2013.01); *G06F 3/041* (2013.01); *G06F 3/044* (2013.01)

(58) Field of Classification Search
CPC .............. G02F 1/13338; G06F 3/0488; G06F 3/04883; G06F 3/044
USPC ...................................... 349/12; 345/173–174
See application file for complete search history.

(56) References Cited

U.S. PATENT DOCUMENTS

| | | | | |
|---|---|---|---|---|
| 2010/0066702 A1* | 3/2010 | Lee et al. | ........................ | 345/174 |
| 2010/0085326 A1* | 4/2010 | Anno | ............................... | 345/174 |
| 2013/0181921 A1* | 7/2013 | Kuwajima et al. | ............ | 345/173 |
| 2013/0229364 A1* | 9/2013 | Yu et al. | ......................... | 345/173 |
| 2014/0071357 A1* | 3/2014 | Kuo et al. | ......................... | 349/12 |

* cited by examiner

*Primary Examiner* — Thanh-Nhan P Nguyen
(74) *Attorney, Agent, or Firm* — Jackson IPG PLLC; Demian K. Jackson

(57) ABSTRACT

The present invention relates to a touch panel. The touch panel includes a display unit, a polarizer disposed on top of the display unit and having at least one edge extending beyond the display unit, multiple upper sensing series disposed on the polarizer, multiple upper peripheral circuits disposed on a peripheral region of the polarizer, each being electrically connected to a corresponding one of the upper sensing series, and a protective layer covering on the upper peripheral circuits.

18 Claims, 8 Drawing Sheets

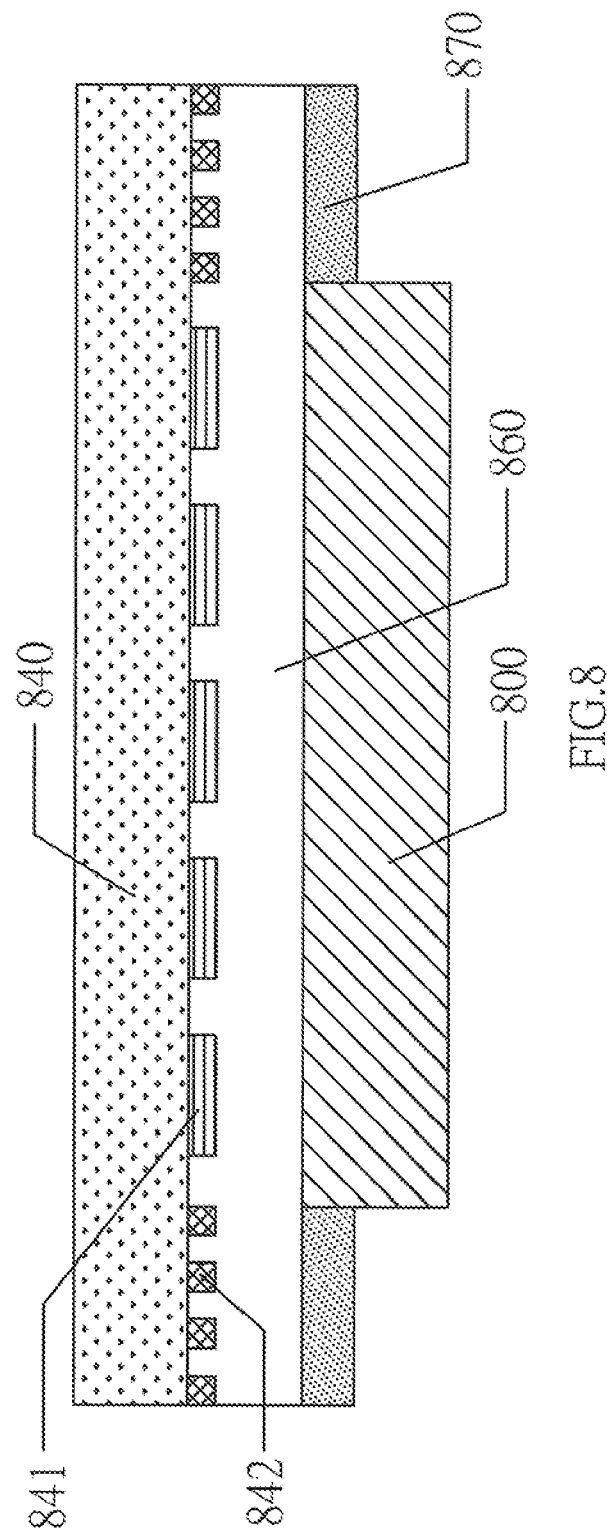

TOUCH PANEL AND MANUFACTURING METHOD THEREOF

CROSS-REFERENCE TO RELATED APPLICATION

This application claims priority to R.O.C. Patent Application No. 101136457, filed Oct. 2, 2012, the disclosure of which is incorporated herein by reference in its entirety.

BACKGROUND OF THE INVENTION

1. Field of the Invention

The present invention relates to a touch panel having a robust and well-protected configuration. The present invention further relates to a method for manufacturing the touch panel.

2. Description of the Prior Art

In the market of consumer electronic products, touch panels have been widely applied in various portable electronic products, such as personal digital assistants (PDAs), mobile phones, laptop computers and tablet computers, to serve as an interface tool for data communication. Meanwhile, as the current trend of designing electronic products leans to meet strong demands for lightweight, slimness and minimization, the electronic products thus designed are often too compact to accommodate conventional input devices, such as a keyboard or a computer mouse. More particularly, in a tablet computer with a user friendly design, a touch panel has become a crucial component. In addition to having the capability of displaying a responsive multi-level menu, a touch panel is adapted to present many user-friendly operation modes, including the cursor function traditionally executed by a keyboard or a computer mouse, the handwriting input function, and so on. Especially, the touch panel has the advantage of integrating the input function and the output function in a same interface (screen) and this advantage cannot be achieved by the conventional input devices.

The touch panels available in the market include the so-called resistive-type, capacitive-type and optical-type touch panels. A capacitive touch panel is usually configured to have a multi-layer structure of sensing electrodes, insulative material and conductive traces stacked on a substrate, and this structure is further combined with a control circuit and a liquid crystal display module. The resultant capacitive touch panel is adapted for being installed in an electronic touch control system. When a finger or a stylus pen touches or approaches the capacitive touch screen, the control circuit detects the capacitance change at the touch point to determine the x/y coordinates of the touch point. Therefore, a conventional touch panel is typically composed of a flat transparent plate and a touch sensing structure, with the transparent plate having a touch region for finger and stylus input. Meanwhile, the conventional touch panel normally includes a peripheral region located along the outer periphery of the touch region, on which metal traces are laid out and electrically connected to the control circuit. In some application occasions, the conventional touch panel, if not well-sealed and protected to resist environmental factors, tends to be contaminated by oil, water or solvent stains due to finger contact or is susceptible to other environmental influences. All of these would reduce the reliability of the touch panel.

SUMMARY OF THE INVENTION

Accordingly, an object of the invention is to provide a touch panel having a robust and well-protected configuration, and a method for manufacturing the touch panel.

In order to achieve the object described above, the touch panel according to the invention comprises a display unit; a polarizer disposed on top of the display unit and having at least one edge extending beyond the display unit; a plurality of upper sensing series disposed on the polarizer; a plurality of upper peripheral circuits disposed on a peripheral region of the polarizer, each being electrically connected to a corresponding one of the upper sensing series; and a protective layer covering on the upper peripheral circuits.

In order to achieve the object described above, a manufacturing method according to the invention comprises the steps of:

providing a display unit;

providing a polarizer and forming on the polarizer a plurality of upper sensing series and a plurality of upper peripheral circuits electrically connected to the upper sensing series;

forming a protective layer to cover on the upper peripheral circuits; and laminating the polarizer onto the display unit, with the polarizer having at least one edge extending beyond the display unit.

In order to achieve the object described above, another manufacturing method according to the invention comprises the steps of:

providing a display unit;

providing a polarizer and forming on the polarizer a plurality of upper sensing series and a plurality of upper peripheral circuits electrically connected to the upper sensing series;

attaching an adhesive layer to the polarizer;

laminating the polarizer onto the display unit, with the polarizer having at least one edge extending beyond the display unit; and forming a protective layer on bottom of the adhesive layer at a position opposite to the upper peripheral circuits located on top of the adhesive layer.

BRIEF DESCRIPTION OF THE DRAWINGS

The above and other objects, features and effects of the invention will become apparent with reference to the following description of the preferred embodiments taken in conjunction with the accompanying drawings, in which:

FIG. 8 is a schematic diagram showing the touch panel structure according to another alternative embodiment of the invention.

DETAILED DESCRIPTION OF THE PREFERRED EMBODIMENTS

Figure 1:
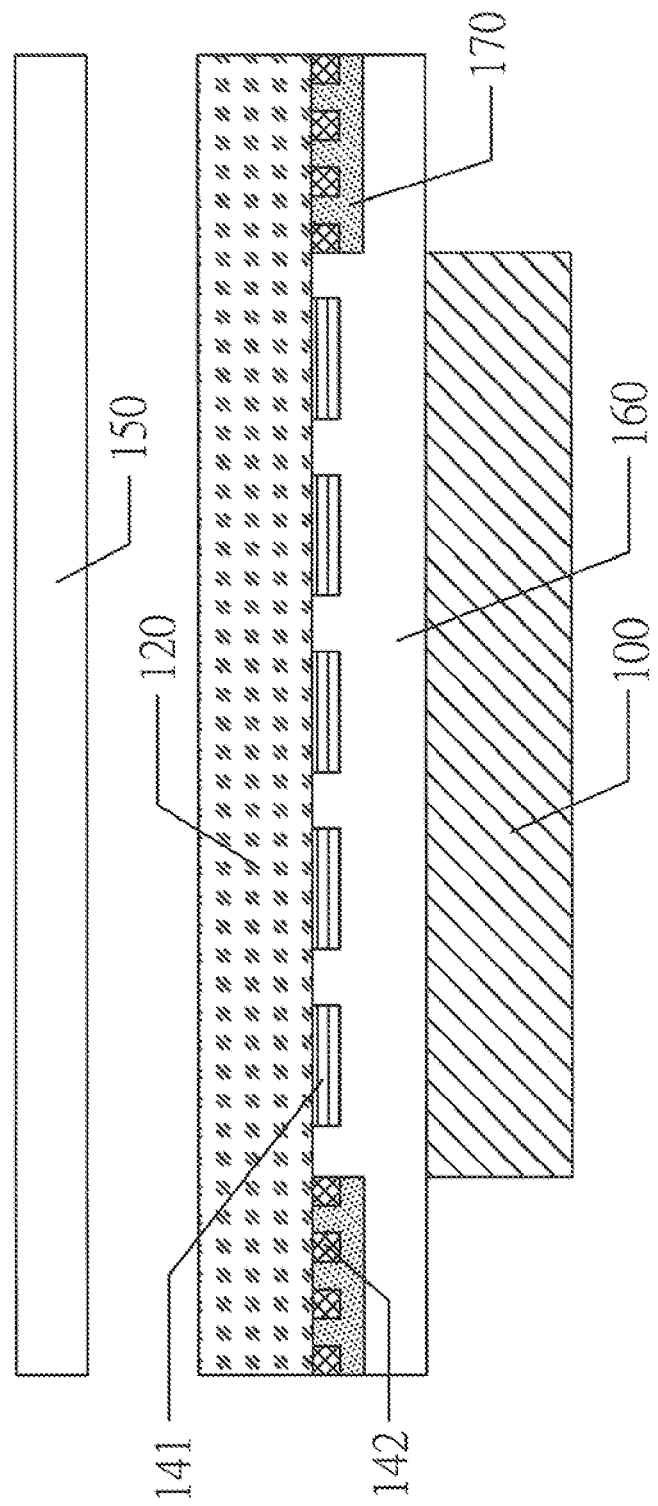
FIG. 1 is a schematic diagram showing the touch panel structure according to the first preferred embodiment of the invention.

FIG. 1 is a schematic diagram showing the touch panel structure according to the first preferred embodiment of the invention. As illustrated, the invented touch panel comprises a display unit 100, such as a liquid crystal display module or an active-matrix organic light-emitting diode (AMOLED). A polarizer 120 is mounted on top of the display unit 100 and comprises at least one edge extending beyond the display unit 100. According to the embodiment shown in FIG. 1, the polarizer 120 includes side edges extending beyond the periphery of the display unit 100. The polarizer 120 is formed on its lower surface with a plurality of upper sensing series 141 and a plurality of upper peripheral circuits 142. Alternatively, the upper sensing series 141 and the upper peripheral circuits 142 may be formed on the upper surface of the polarizer 120. The upper sensing series 141 may comprise a plurality of first sensing series extending in a first direction (not shown) and a plurality of second sensing series extending in a second direction (not shown). The first sensing series and the second sensing series are electrically insulated from each other and arranged in an alternate manner. Conventional techniques, such as bridge wiring, jump wiring, adding an insulation component, designing a conductive bridge and so on, may be utilized to build up the touch panel structure. Alternatively, the upper sensing series 141 are composed of a plurality of sensing series extending in a first direction to constitute a single surface touch sensing structure. The respective upper peripheral circuits 142 are disposed on a peripheral region of the polarizer 120 and electrically connected to a corresponding one of the upper sensing series 141. The touch panel structure disclosed herein further comprises a protective layer 170 covering on the upper peripheral circuits 142. The protective layer 170 is a photoresist layer or a black-matrix layer (BM), so as to protect the upper peripheral circuits 142 from malfunction or damage caused by water ingress. The polarizer 120 and the display unit 100 are laminated together with an adhesive layer 160, with the lower surface of the polarizer 120 facing the display unit 100. Preferably, a transparent protective substrate 150 is mounted atop the polarizer 120 and serves as a cover lens providing protection to the touch panel. More preferably, the transparent protective substrate 150 is made of glass, tempered glass, polycarbonate (PC), polymethylmethacrylate (PMMA), or composite material of PC and PMMA.

In the method for manufacturing the touch panel according to the first preferred embodiment of the invention, a display unit 100 and a polarizer 120 were provided and a transparent conductive layer (not shown) and a metallic layer (not shown) were sequentially formed on the polarizer 120. The transparent conductive layer and the metallic layer were independently formed by the same or different processes, such as by a physical vapor deposition (PVD) process, a chemical vapor deposition (CVD) process, an electroplating process, a coating process or any suitable film-forming process. The transparent conductive layer is made of, for example, a metal oxide, a silver nanowire or a nano-scale conductive metal material. Preferably, the metal oxide is selected from the group consisting of indium tin oxide (ITO), indium zinc oxide (IZO), cadmium tin oxide (CTO), aluminum zinc oxide (AZO), indium tin zinc oxide (ITZO), zinc oxide, cadmium oxide, hafnium oxide (HfO), indium gallium zinc oxide (InGaZnO), indium gallium zinc magnesium oxide (InGaZnMgO), indium gallium magnesium oxide (InGaMgO) and indium gallium aluminum oxide (InGaAlO). The metallic layer comprises one or more layers of conductive metal material, which includes but is not limited to a copper alloy, an aluminum alloy, gold, silver, aluminum, copper and molybdenum. In the case where the metallic layer comprises multiple layers of conductive metal material, the metallic layer is preferably configured in the form of a multi-layer stack structure, with each layer being independently made of a copper alloy, an aluminum alloy, gold, silver, aluminum, copper, molybdenum or a combination thereof. More preferably, the metallic layer was configured in the form of a multi-layer stack structure having an aluminum layer sandwiched by two molybdenum layers. Afterwards, the metallic layer and the transparent conductive layer were patterned by, for example, a two-step process using roll-to-roll photolithography technique or roll-to-roll laser ablation technique, whereby the upper sensing series 141 and the upper peripheral circuits 142 were formed in such a manner that the respective upper sensing series 141 are electrically connected to a corresponding one of the upper peripheral circuits 142. According to the embodiment disclosed herein, the sensing series, each comprising multiple conductive units, were fabricated by forming patterned transparent conductive layer and patterned metallic layer using a first lithographic process and then forming the upper sensing series 141 and the upper peripheral circuits 142 using a second lithographic process to etch away the metallic material coated on the upper sensing series 141. The upper peripheral circuits 142 were then coated with and covered by a protective layer 170 using, for example, a printing process, a photolithographic process or an ink-jet printing process. The polarizer 120 and the display unit 100 were then laminated together with an adhesive layer 160, with the polarizer 120 having at least one edge extending beyond the display unit 100. The adhesive layer 160 is selected from an optically clear adhesive, an aqueous adhesive or a polymeric adhesive composition. The touch panel disclosed herein was produced accordingly.

Figure 2:
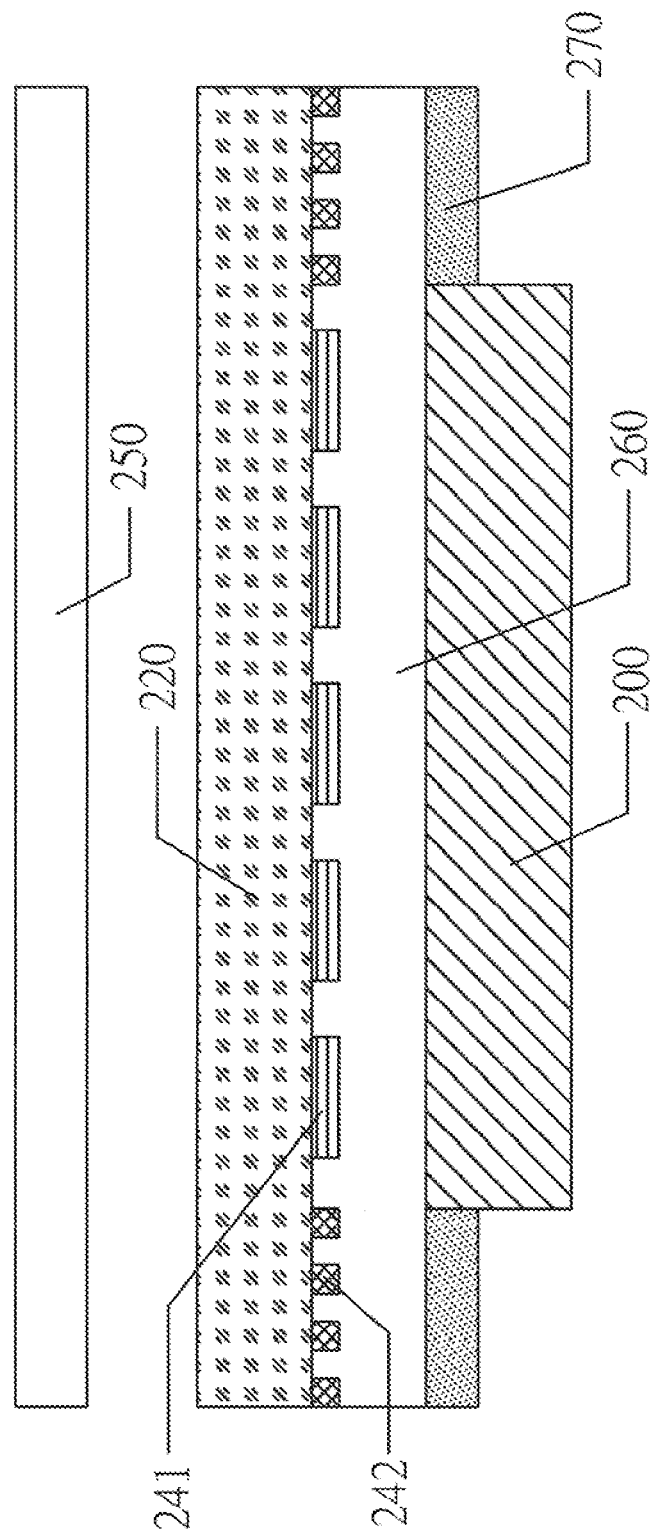
FIG. 2 is a schematic diagram showing the touch panel structure according to the second preferred embodiment of the invention.

FIG. 2 is a schematic diagram showing the touch panel structure according to the second preferred embodiment of the invention. As illustrated, the invented touch panel comprises a display unit 200. A polarizer 220 is mounted on top of the display unit 200 and comprises at least one edge extending beyond the display unit 200. The polarizer 220 is formed on its lower surface with a plurality of upper sensing series 241 and a plurality of upper peripheral circuits 242. As an alternative, the upper sensing series 241 and the upper peripheral circuits 242 may be formed on the upper surface of the polarizer 220. The upper sensing series 241 may comprise a plurality of first sensing series extending in a first direction (not shown) and a plurality of second sensing series extending in a second direction (not shown). The first sensing series and the second sensing series are electrically insulated from each other and arranged in an alternate manner. Alternatively, the upper sensing series 241 are composed of a plurality of sensing series extending in a first direction to constitute a single surface touch sensing structure. The respective upper peripheral circuits 242 are disposed on a peripheral region of the polarizer 220 and electrically connected to a corresponding one of the upper sensing series 241. The polarizer 220 and the display unit 200 are laminated together with an adhesive layer 260, with the lower surface of the polarizer 220 facing the display unit 200. A protective layer 270 is disposed on bottom of the adhesive layer 260 at a position opposite to the upper peripheral circuits 242 located on top of the adhesive layer 260. The protective layer 270 may by way of example be a polyester layer or a waterproof layer. The polyester layer is made of polyester material including, but being not limited to, polyethylene terephthalate (PET), polyester (PE), polyamide (PA), polyvinyl chloride (PVC), polycarbonate (PC). The material suitable for making the water-proof layer includes but is not limited to polymeric material doped with a water repellant, a silicone or a waterproof resin. The protective layer 270 acts to protect the upper peripheral circuits 242 from malfunction or damage caused by water ingress.

In the method for manufacturing the touch panel according to the second preferred embodiment of the invention, a display unit 200 and a polarizer 220 were provided and a transparent conductive layer (not shown) and a metallic layer (not shown) were sequentially formed on the polarizer 220. The transparent conductive layer and the metallic layer were independently formed by the same or different processes, such as by a physical vapor deposition (PVD) process, a chemical vapor deposition (CVD) process, an electroplating process, a coating process or any suitable film-forming process. Afterwards, the metallic layer and the transparent conductive layer were patterned by, for example, a two-step process using roll-to-roll photolithography technique or laser ablation technique, whereby the upper sensing series 241 and the upper peripheral circuits 242 were formed in such a manner that the respective upper sensing series 241 are electrically connected to a corresponding one of the upper peripheral circuits 242. Preferably, the patterning was performed using photolithography technique well-known in the art, which includes, in sequence, photoresist coating, soft baking, mask aligning, exposure, post-exposure, developing photoresist and hard baking. The polarizer 220 is then attached with an adhesive layer 260 made of, for example, an optically clear adhesive, an aqueous adhesive or a polymeric adhesive composition. The polarizer 220 and the display unit 200 were then laminated together via the adhesive layer 260, with the polarizer 220 having at least one edge extending beyond the display unit 200. A protective layer 270 was formed at an opposite position of the adhesive layer 260 with respect to the upper peripheral circuits 242 by adhesion, printing, photolithography, ink-jet printing, spraying, spin coating or slit coating.

Figure 3:
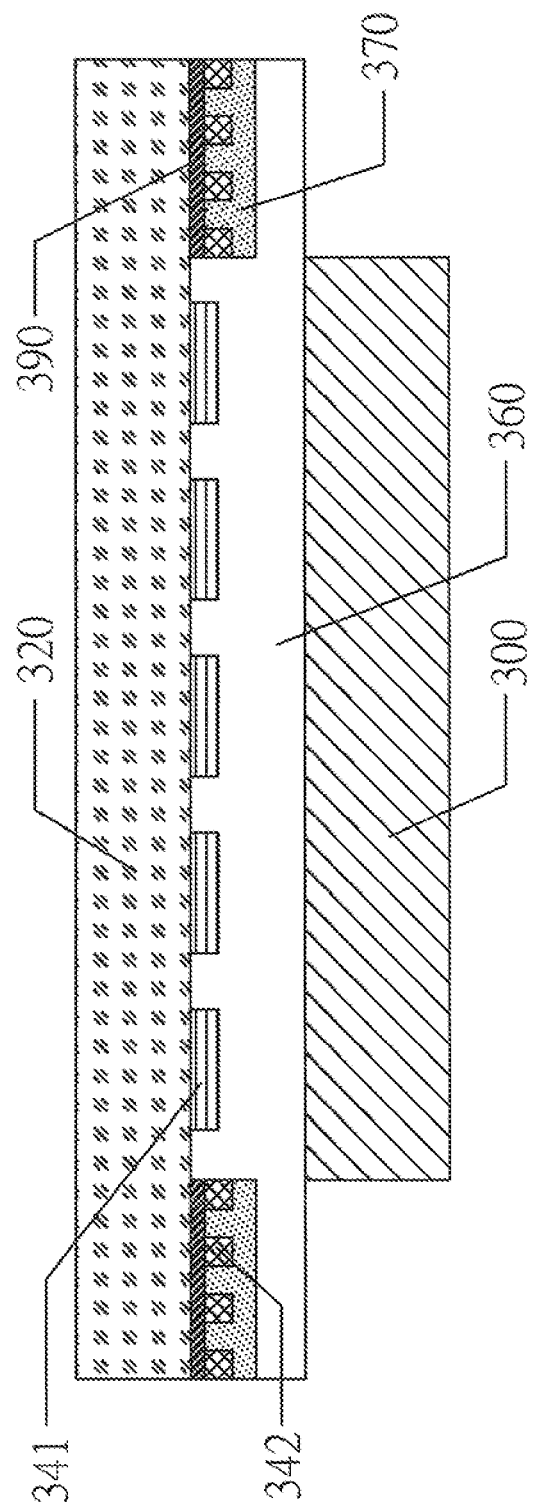
FIG. 3 is a schematic diagram showing the touch panel structure according to the third preferred embodiment of the invention.

FIG. 3 is a schematic diagram showing the touch panel structure according to the third preferred embodiment of the invention. As illustrated, the invented touch panel comprises a display unit 300. A polarizer 320 is mounted on top of the display unit 300 and comprises at least one edge extending beyond the display unit 300. The polarizer 320 is formed on its lower surface with a patterned light-shielding layer 390 and a plurality of upper sensing series 341 and a plurality of upper peripheral circuits 342. Alternatively, the upper sensing series 341 and the upper peripheral circuits 342 may be formed on the upper surface of the polarizer 320. The upper sensing series 341 may comprise a plurality of first sensing series extending in a first direction (not shown) and a plurality of second sensing series extending in a second direction (not shown). The first sensing series and the second sensing series are electrically insulated from each other and arranged in an alternate manner. As an alternative, the upper sensing series 341 are composed of a plurality of sensing series extending in a first direction to constitute a single surface touch sensing structure. The respective upper peripheral circuits 342 are disposed on a peripheral region of the polarizer 320 and electrically connected to a corresponding one of the upper sensing series 341. Meanwhile, the respective upper peripheral circuits 342 are disposed beneath the patterned light-shielding layer 390, so that the upper peripheral circuits 342 are masked by the patterned light-shielding layer 390. By way of example, the patterned light-shielding layer 390 is made of metallic chromium, photoresist material, a black-color resin, Ni/W or an ink. The patterned light-shielding layer 390 may be formed by a lithography and etching process, which comprises coating a layer of photoresist, selectively exposing the resultant photoresist layer using a photo-mask and developing and then etching the photoresist layer. The patterned light-shielding layer 390 may also be formed by printing ink technology or using photoresist material. The polarizer 320 and the display unit 300 are laminated together with an adhesive layer 360, with the lower surface of the polarizer 320 facing the display unit 300. The touch panel structure disclosed herein further comprises a protective layer 370 covering on the upper peripheral circuits 342. The protective layer 370 acts to protect the upper peripheral circuits 342 from malfunction or damage caused by water ingress.

Figure 4:
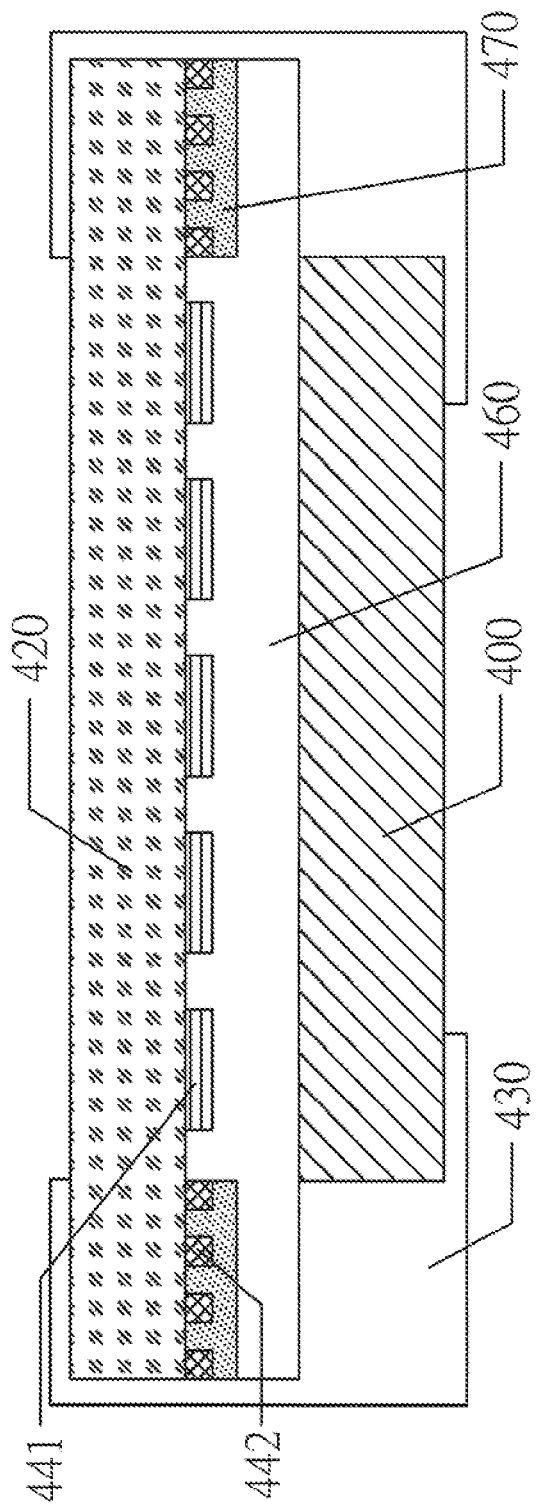
FIG. 4 is a schematic diagram showing the touch panel structure according to the fourth preferred embodiment of the invention.

FIG. 4 is a schematic diagram showing the touch panel structure according to the fourth preferred embodiment of the invention. Similar to the embodiments described above, the invented touch panel comprises a display unit 400. A polarizer 420 is mounted on top of the display unit 400 and comprises at least one edge extending beyond the display unit 400. The polarizer 420 is formed on its lower surface with a plurality of upper sensing series 441 and a plurality of upper peripheral circuits 442. Alternatively, the upper sensing series 441 and the upper peripheral circuits 442 may be formed on the upper surface of the polarizer 420. The respective upper peripheral circuits 442 are disposed on a peripheral region of the polarizer 420 and electrically connected to a corresponding one of the upper sensing series 441. The upper sensing series 441 may comprise a plurality of first sensing series extending in a first direction (not shown) and a plurality of second sensing series extending in a second direction (not shown). The first sensing series and the second sensing series are electrically insulated from each other and arranged in an alternate manner. As an alternative, the upper sensing series 341 are composed of a plurality of sensing series extending in a first direction to constitute a single surface touch sensing structure. The polarizer 420 and the display unit 400 are laminated together to with an adhesive layer 460, with the lower surface of the polarizer 420 facing the display unit 400. A protective layer 470 is formed to cover on the upper peripheral circuits 442. The protective layer 470 acts to protect the upper peripheral circuits 442 from malfunction or damage caused by water ingress. As shown in FIG. 4, the embodiment disclosed herein further comprises an outer frame 430 for shielding the upper peripheral circuits 442 and for holding the display unit 400 and the polarizer 420 along their peripheries, so that the upper peripheral circuits 442 are not exposed to the outside. By virtue of masking the upper peripheral circuits 442 by the outer frame 430, the touch panel structure disclosed herein has a light-weight, slim configuration and satisfies the aesthetic demands.

In the embodiment described above, the upper sensing series may comprise a plurality of first sensing series extending in a first direction (not shown) and a plurality of second sensing series extending in a second direction (not shown). The first sensing series and the second sensing series are electrically insulated from each other and arranged in an alternate manner. The first sensing series are located on the upper surface of the polarizer, whereas the second sensing series are located on the lower surface of the polarizer.

Figure 5:
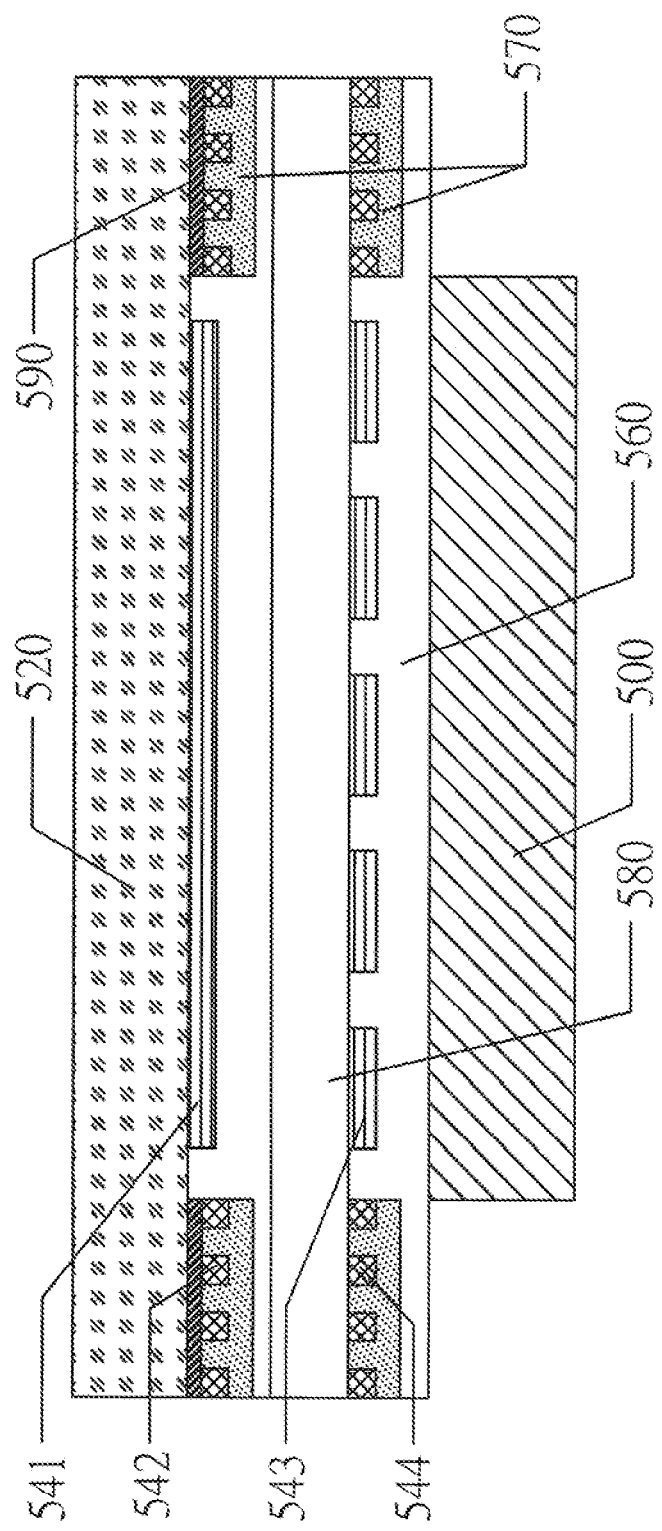
FIG. 5 is a schematic diagram showing the touch panel structure according to the fifth preferred embodiment of the invention.

FIG. 5 is a schematic diagram showing the touch panel structure according to the fifth preferred embodiment of the invention. Similar to the embodiments described above, the invented touch panel comprises a display unit 500. A flexible transparent substrate 580 and a polarizer 520 are sequentially mounted on top of the display unit 500, with the polarizer 520 comprising at least one edge extending beyond the display unit 500. The polarizer 520 is formed on its lower surface with a plurality of upper sensing series 541 and a plurality of upper peripheral circuits 542. The respective upper peripheral circuits 542 are disposed on a peripheral region of the polarizer 520 and electrically connected to a corresponding one of the upper sensing series 541. The flexible transparent substrate 580 is formed on its lower surface with a plurality of lower sensing series 543 and a plurality of lower peripheral circuits 544. The upper sensing series 541 and the lower sensing series 543 are electrically insulated from each other and arranged in an alternate manner. The flexible transparent substrate 580 is made of low retardation material including, but being not limited to, triacetyl cellulose (TAC) and polymethylmethacrylate (PMMA). The respective lower peripheral circuits 544 are disposed on a peripheral region of the flexible transparent substrate 580 and electrically connected to a corresponding one of the lower sensing series 543. The polarizer 520 and the flexible transparent substrate 580 are laminated together via an adhesive layer 560, with the lower surface of the polarizer 520 facing the flexible transparent substrate 580. The flexible transparent substrate 580 and the display unit 500 are laminated together via another adhesive layer 560, with the lower surface of the flexible transparent substrate 580 facing the display unit 500. The upper peripheral circuits 542 and the lower peripheral circuits 544 are covered by a protective layer 570, respectively. The protective layers 570 act to protect the upper peripheral circuits 542 and the lower peripheral circuits 544 from malfunction or damage caused by water ingress. Furthermore, according to the embodiment shown in FIG. 5, the polarizer 520 may be formed on its lower surface with a patterned light-shielding layer 590 to mask the upper peripheral circuits 542 and the lower peripheral circuits 544, thereby satisfying the aesthetic demands for the touch panel.

Figure 6:
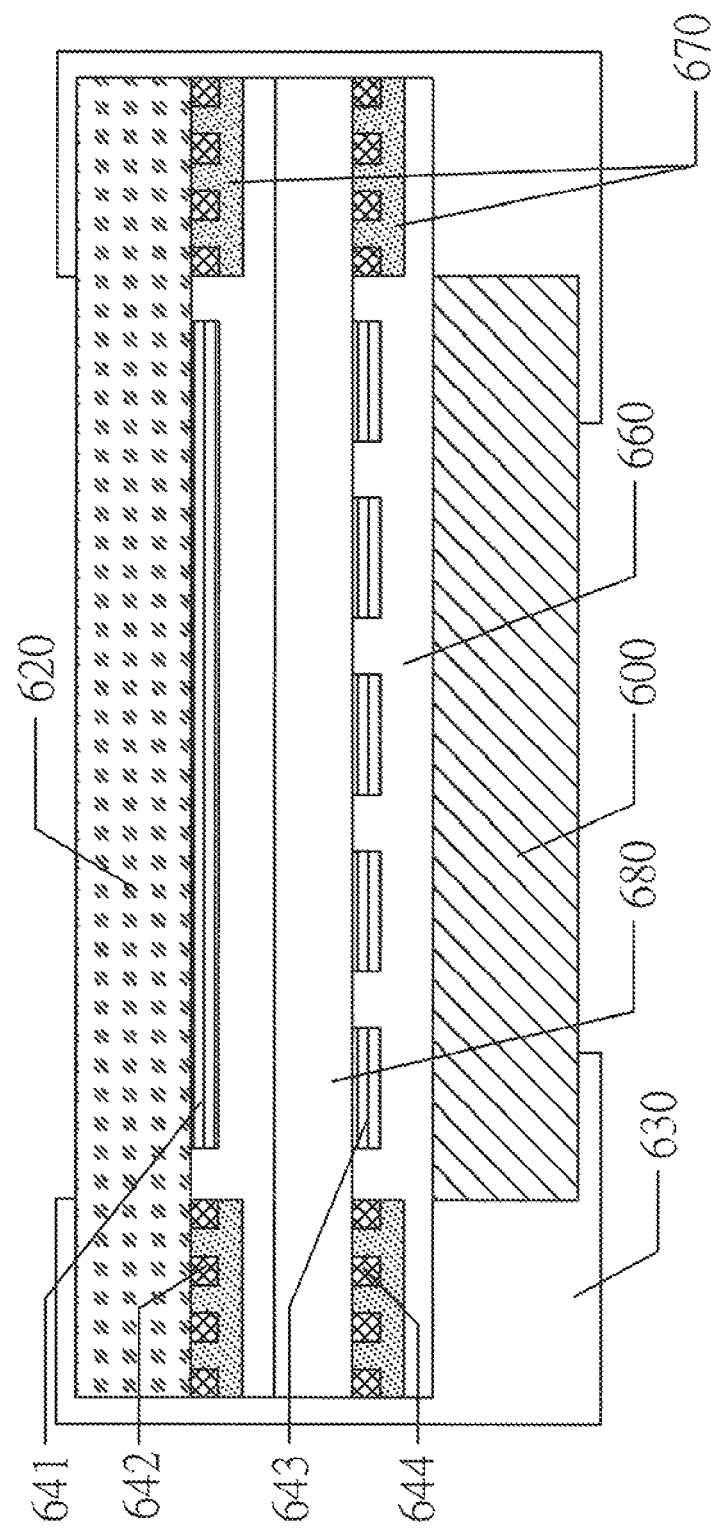
FIG. 6 is a schematic diagram showing the touch panel structure according to the sixth preferred embodiment of the invention.

FIG. 6 is a schematic diagram showing the touch panel structure according to the sixth preferred embodiment of the invention. Similar to the embodiments described above, the invented touch panel comprises a display unit 600. A flexible transparent substrate 680 and a polarizer 620 are sequentially mounted on top of the display unit 600, with the polarizer 620 comprising at least one edge extending beyond the display unit 600. The polarizer 620 is formed on its lower surface with a plurality of upper sensing series 641 and a plurality of upper peripheral circuits 642. The respective upper peripheral circuits 642 are disposed on a peripheral region of the polarizer 620 and electrically connected to a corresponding one of the upper sensing series 641. The flexible transparent substrate 680 is formed on its lower surface with a plurality of lower sensing series 643 and a plurality of lower peripheral circuits 644. The upper sensing series 641 and the lower sensing series 643 are electrically insulated from each other and arranged in an alternate manner. The flexible transparent substrate 680 is made of low retardation material including, but being not limited to, triacetyl cellulose (TAC) and polymethylmethacrylate (PMMA). The respective lower peripheral circuits 644 are disposed on a peripheral region of the flexible transparent substrate 680 and electrically connected to a corresponding one of the lower sensing series 643. The polarizer 620 and the flexible transparent substrate 680 are laminated together via an adhesive layer 660, with the lower surface of the polarizer 620 facing the flexible transparent substrate 680. The flexible transparent substrate 680 and the display unit 600 are laminated together via another adhesive layer 660, with the lower surface of the flexible transparent substrate 680 facing the display unit 600. The upper peripheral circuits 642 and the lower peripheral circuits 644 are covered by a protective layer 670, respectively. The protective layers 670 protect the upper peripheral circuits 642 and the lower peripheral circuits 644 from malfunction or damage caused by water ingress. As shown in FIG. 6, the embodiment disclosed herein further comprises an outer frame 630 to mask the upper peripheral circuits 642 and the lower peripheral circuits 644, thereby satisfying the aesthetic demands for the touch panel. The outer frame 630 further holds the display unit 600 and the polarizer 620 along their peripheries, while preventing the upper peripheral circuits 642 and the lower peripheral circuits 644 from exposure to the outside. By virtue of the outer frame 630, the touch panel structured is closed herein has a lightweight, slim configuration and satisfies the aesthetic demands.

The protective layers described above from the third embodiment to the sixth embodiment may be alternatively disposed on bottom of the adhesive layer at a position opposite to the upper peripheral circuits located on top of the adhesive layer, similar to that shown in FIG. 2. In this case, the protective layer can still provide excellent protection to the upper peripheral circuits, thereby preventing them from malfunction or damage caused by water ingress. In addition, the polarizer described in the embodiments above maybe replaced with a flexible transparent substrate when necessary.

Figure 7:
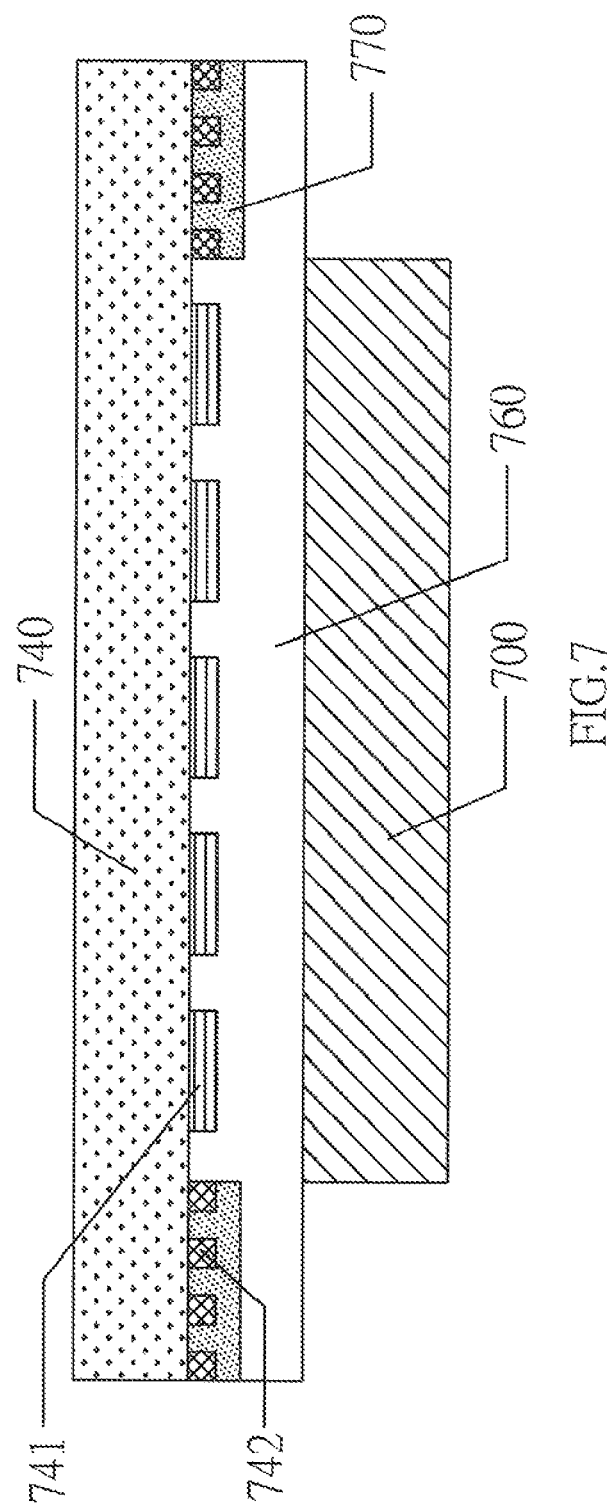
FIG. 7 is a schematic diagram showing the touch panel structure according to an alternative embodiment of the invention.

FIG. 7 is a schematic diagram showing the touch panel structure according to an alternative embodiment of the invention. As illustrated, the invented touch panel comprises a display unit 700, a first flexible transparent substrate 740, a plurality of upper sensing series 741, a plurality of upper peripheral circuits 742 and a protective layer 770 covering on the upper peripheral circuits 742. The protective layer 770 protects the upper peripheral circuits 742 from malfunction or damage caused by water ingress. The first flexible transparent substrate 740 is made of low retardation material including, but being not limited to, TAC and PMMA.

FIG. 8 is a schematic diagram showing the touch panel structure according to another alternative embodiment of the invention. As illustrated, the invented touch panel comprises a display unit 800, a first flexible transparent substrate 840, a plurality of upper sensing series 841, a plurality of upper peripheral circuits 842, an adhesive layer 860 and a protective layer 870. The first flexible transparent substrate 840 and the display unit 800 are laminated together with the adhesive layer 860, with the lower surface of the first flexible transparent substrate 840 facing the display unit 800. The protective layer 870 is disposed on bottom of the adhesive layer 860 at a position opposite to the upper peripheral circuits 842 located atop the adhesive layer 860. The protective layer 870 provides excellent protection to the upper peripheral circuits 842, thereby preventing them from malfunction or damage caused by water ingress.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit of the invention and the scope thereof as defined in the appended claims.

What is claimed is:
1. A touch panel, comprising:
a display unit;
a polarizer disposed on top of the display unit and having at least one edge extending beyond the display unit;
a plurality of upper sensing series disposed on the polarizer;
a plurality of upper peripheral circuits disposed on a peripheral region of the polarizer, with the respective upper peripheral circuits being electrically connected to a corresponding one of the upper sensing series; and
a protective layer covering on the upper peripheral circuits.

2. The touch panel according to claim 1, wherein the protective layer is a layer of photoresist or black-matrix.

3. The touch panel according to claim 1, wherein the upper sensing series further comprises a plurality of first sensing series extending in a first direction and a plurality of second sensing series extending in a second direction, with the first sensing series and the second sensing series being arranged in an alternate manner and electrically insulated from each other.

4. The touch panel according to claim 1, further comprising a transparent protective substrate mounted on the polarizer.

5. The touch panel according to claim 1, wherein the polarizer is formed on its lower surface with a patterned light-shielding layer, so that the upper peripheral circuits are masked by the patterned light-shielding layer.

6. The touch panel according to claim 1, further comprising an outer frame to hold the display unit and the polarizer along their peripheries, thereby masking the upper peripheral circuits.

7. The touch panel according to claim 1, wherein the polarizer and the display unit are laminated together with an adhesive layer, with the polarizer having a lower surface facing the display unit, and wherein the protective layer is disposed on bottom of the adhesive layer.

8. The touch panel according to claim 7, wherein the protective layer is a polyester layer or a waterproof layer.

9. The touch panel according to claim 7, wherein the upper sensing series further comprises a plurality of first sensing series extending in a first direction and a plurality of second sensing series extending in a second direction, with the first sensing series and the second sensing series being arranged in an alternate manner and electrically insulated from each other.

10. The touch panel according to claim 7, further comprising a transparent protective substrate mounted on the polarizer.

11. The touch panel according to claim 7, wherein the polarizer is formed on its lower surface with a patterned light-shielding layer, so that the upper peripheral circuits are masked by the patterned light-shielding layer.

12. The touch panel according to claim 7, further comprising an outer frame to hold the display unit and the polarizer along their peripheries, thereby masking the upper peripheral circuits.

13. A method for manufacturing a touch panel, comprising the steps of:
   providing a display unit;
   providing a polarizer and forming on the polarizer a plurality of upper sensing series and a plurality of upper peripheral circuits electrically connected to the upper sensing series;
   forming a protective layer to cover on the upper peripheral circuits; and
   laminating the polarizer onto the display unit, with the polarizer having at least one edge extending beyond the display unit.

14. The method according to claim 13, wherein the formation of the upper sensing series and the upper peripheral circuits is performed by roll-to-roll photolithography or roll-to-roll laser ablation.

15. The method according to claim 13, wherein the formation of the protective layer is performed by printing, photolithography or ink-jet printing.

16. A method for manufacturing a touch panel, comprising the steps of:
   providing a display unit;
   providing a polarizer and forming on the polarizer a plurality of upper sensing series and a plurality of upper peripheral circuits electrically connected to the upper sensing series;
   attaching an adhesive layer to the polarizer;
   laminating the polarizer onto the display unit, with the polarizer having at least one edge extending beyond the display unit; and
   forming a protective layer on bottom of the adhesive layer at a position opposite to the upper peripheral circuits located on top of the adhesive layer.

17. The method according to claim 16, wherein the formation of the upper sensing series and the upper peripheral circuits is performed by roll-to-roll photolithography or roll-to-roll laser ablation.

18. The method according to claim 16, wherein the formation of the protective layer is performed by printing, photolithography or ink-jet printing.

* * * * *